United States Patent [19]

Prud'homme van Reine

[11] Patent Number: 4,620,131
[45] Date of Patent: Oct. 28, 1986

[54] LAMP WITH DISCHARGE VESSEL MADE OF DENSELY SINTERED TRANSLUCENT ALUMINIUM OXIDE

[75] Inventor: Peter R. Prud'homme van Reine, Eindhoven, Netherlands

[73] Assignee: U.S. Philips Corporation, New York, N.Y.

[21] Appl. No.: 629,140

[22] Filed: Jul. 9, 1984

[30] Foreign Application Priority Data

Jul. 25, 1983 [NL] Netherlands ............... 8302638

[51] Int. Cl.[4] .............. H01J 17/16; H01J 61/30
[52] U.S. Cl. ............................. 313/636; 313/635
[58] Field of Search ............... 313/636, 635; 220/2.1 R

[56] References Cited

U.S. PATENT DOCUMENTS 4,150,317  4/1979  Laska et al. ............... 313/636
4,182,972  1/1980  Kaneno et al. ............ 313/636
4,214,666  7/1980  Oda et al. .................. 220/2.1 R

FOREIGN PATENT DOCUMENTS 0021430  6/1971  Japan ...................... 313/636
0055278  5/1977  Japan ...................... 313/636

Primary Examiner—David K. Moore
Attorney, Agent, or Firm—Emmanuel J. Lobato

[57] ABSTRACT

The invention relates to a lamp comprising a discharge vessel of densely sintered translucent aluminum oxide, which is formed for the major part from crystals of at most 60 μm. At least the inner surface of the discharge vessel is formed for at least 50% from crystals whose size lies between 60 μm and 300 μm, which crystal size distribution extends over a layer thickness of one crystal. Such a discharge vessel has a very high resistance to corrosion and is therefore particularly suitable to be used in high-pressure metal vapor discharge lamps.

4 Claims, 1 Drawing Figure

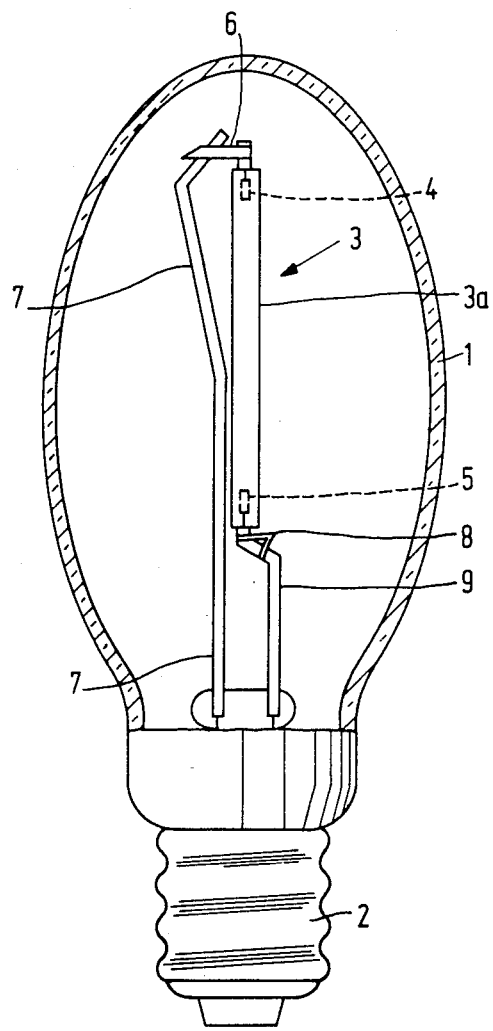

LAMP WITH DISCHARGE VESSEL MADE OF DENSELY SINTERED TRANSLUCENT ALUMINIUM OXIDE

BACKGROUND OF THE INVENTION

The invention relates to a lamp comprising a discharge vessel provided with a wall of densely sintered translucent aluminum oxide formed for the major part from crystals having a size of at most 60 μm.

Such a lamp is known from U.S. Pat. No. 4,214,666 in the form of a high-pressure discharge lamp. When used as material for the discharge vessel, the densely sintered translucent aluminum oxide is exposed to corrosive action of partly ionized filling constituents at temperatures up to approximately 1500 K. Although in practice lamps are realized having a life of a few thousands of operating hours, it has been found that in a number of cases the wall material is attacked by filling constituents during the life of the lamp. This results inter alia in filling constituents being extracted from the discharge and hence in the properties of the lamp being changed; for example, the specific light output is reduced, the arc voltage increases and there is a risk of the discharge vessel becoming leaky. A discharge vessel that has become leaky has reached the end of its life.

A discharge vessel provided with a wall of aluminum oxide is known from British Pat. No. 1034122, in which the inner surface of the wall is formed from a single crystal. Although satisfactory gas-tightness of the wall of the discharge vessel is thus obtained, it has been found that with such a stratified structure of the lamp ruptures are inevitably formed as the stratified parts fail under practical operating conditions of the discharge lamp. This leads to the end of the life of the lamp.

SUMMARY OF THE INVENTION

The invention provides means for resisting the attack upon the discharge vessel. According to the invention, for this purpose the lamp is characterized in that at least the inner surface of the wall of the discharge vessel is formed at least 50% from crystals having a maximum dimension larger than 60 μm and smaller than 300 μm, which crystal size distribution extends over a layer thickness of one crystal.

A discharge vessel consisting of such a densely sintered translucent aluminum oxide is found to have a high resistance to corrosive attack at temperatures up to approximately 1500 K. It is a surprise to find that the mechanical strength of such a discharge vessel is comparable with that of a similar discharge vessel consisting for the major part of comparatively small crystals of aluminum oxide.

It is known in practice that crystal size influences the translucency and the mechanical strength of a densely sintered article. A small crystal size is favorable to mechanical strength and a large crystal size favorable influences the translucency. For materials used for discharge vessels of high-pressure discharge lamps, this has led to the compromise commonly applied in practice that the material is composed of crystals whose average size lies mainly between 30 and 45 μm. A very substantial spread in size of the individual crystals may then occur.

With respect to the mechanical strength, it should be noted that the highest loads occur when the lamp is switched on and off, that is to say at those instants at which large temperature variations occur in the lamp. It has been found that the tensile strength determines the mechanical resistance of the material. Investigations have shown that there is a simple relation between the average crystal size and the tensile strength of the material. This means inter alia that a larger wall thickness does not result in a discharge vessel of substantially greater strength.

The use of wall material comprising large to very large crystals is known per se from U.S. Pat. No. 4,182,972. However, the crystal size distribution described therein relates both to the wall surface and to the interior of the wall of the discharge vessel. Consequently, the material described has favourable translucent properties, but in practice the mechanical strength proves to be insufficient.

Means are known from German Offenlegungsschrift 2,609,974 (Corresponding to U.S. Pat. No. 4,264,541) for improving the mechanical strength at the ends of a tube made of densely sintered aluminum oxide. The improvement is achieved in that the tube is manufactured in such a manner that near the tube ends the crystals have a size lying between 1 and 20 μm and in the remaining part of the tube have a size of more than 20 μm. Although in this manner tubes with tube ends of great mechanical strength can be obtained, the use of mainly large crystals (60 μm or larger) in the remaining part of the tube will lead in practice to insufficient strength of this part.

With respect to the resistance to corrosive attack, it should be noted that the processes by which the attacking phenomena occur are for the major part unknown. However, experiments have given strong indications that these processes are effected in many cases at or near crystal boundaries. A reduced sensitivity of tube ends as compared with other tube parts is then not found to occur.

Preferably, in a lamp according to the invention at least the inner surface of the discharge vessel is formed 80% from crystals having a size of 80 to 120 μm. Experiments have shown that such a construction has both a high resistance to a prolonged corrosive attack and a very great mechanical strength. The latter becomes manifest inter alia in the field of use where the lamp is subjected to frequent switching. Moreover, it has been found that the risk of spontaneous microcrack formation is substantially excluded. Such a microcrack formation is due to the anisotropic structure of the densely sintered aluminium oxide and is more likely to occur as the crystal size increases.

DETAILED DESCRIPTION OF THE INVENTION

An embodiment of a lamp according to the invention will now be described more fully with reference to the drawing, which shows a high-pressure mercury vapor discharge lamp having a discharge vessel provided with a wall according to the invention. In the drawing, reference numeral 1 designates an outer bulb of the lamp provided with a lamp cap 2. The outer bulb encloses a discharge vessel 3, whose wall 3a consists of densely sintered translucent polycrystalline aluminium oxide. The discharge vessel is provided with two electrodes 4 and 5, between which the discharge takes place in the operating condition of the lamp. The electrode 4 is connected by means of a metal strip 6 to a rigid supply conductor 7. This supply conductor leads to a connection member of the lamp cap 2. The electrode 5 is likewise connected through a metal strip 8 to a rigid supply conductor 9, which leads to another connection member of the lamp cap 2.

The thickness of the wall 3a of the discharge vessel 3 of the lamp described is 0.6 mm. The inner surface of the wall 3a is occupied by crystals having a size lying between 60 μm and 300 μm, 80% of these crystals having a size of 80 to 120 μm. This crystal size distribution of the surface extends over a layer thickness of one crystal and is 40 μm on an average. For the remaining part, the wall consists of crystals of at most 60 μm having an average size of 45 μm.

The discharge vessel is obtained as follows. A pulverulent mixture of aluminum oxide containing 1000 ppm by weight of MgO is kneaded with a binder (for example, methyl cellulose) and water to form a plastic mass and is then moulded into the desired shape by extrusion. Subsequently, the mixture is preheated at 1280° C. for 3 hours in an oxidizing atmosphere. The moulding is then sintered in a vacuum of $10^{-5}$ Torr at a temperature of approximately 1800° C. for 4 hours.

The lamp described has a power of 70 W and is suitable to be operated at a supply voltage of 200 V, 50 Hz. In the operating condition, the lamp has an arc voltage of 103 V and a light output of 94 lm/W after 100 operating hours. During its life, the arc voltage initially decreased and reached after 3000 hours a minimum at approximately 93 V. Subsequently, the arc voltage increased again and reached the level at 100 hours after 7000 operating hours. After an overall operating time of 10,000 hours, the lamp was removed and examined. The overall decrease in light output was within 13% with respect to the level at 100 hours.

A comparable commerically available conventional lamp has an arc voltage at 100 operating hours of 92 V and a light output of 87 lm/W. After 1000 hours, the arc voltage is a minimum and amounts to 82 V. After 4400 hours, the arc voltage has again reached the level at 100 hours. After an operating time of 6000 hours, the lamp was removed for examination. At the end of the life, the arc voltage was 102 V and the light output was 76 lm/W.

What is claimed is:

1. A lamp comprising a discharge vessel provided with a wall of densely sintered translucent aluminum oxide formed for the major part from crystals having a size of at most 60 μm, characterized in that at least 50% of the inner surface is formed from a first group of crystals having a maximum dimension larger than 60 μm and smaller than 300 μm, the remainder of said crystals having a grain size different from said first group of crystals, which crystal size distribution extends over a layer thickness of one crystal that provide high resistivity to corrosive attack.

2. A lamp as claimed in claim 1, characterized in that at least 80% of the inner surface of the wall of the discharge vessel is formed by crystals having a size of 80 μm to 120 μm.

3. A discharge vessel body for an electric discharge lamp, comprising a vessel body of densely sintered transparent aluminum oxide having a wall with one surface constituting an inner surface of said vessel body and another surface constituting an outer surface of said vessel body, said inner surface of said vessel body having a region of one grain thickness comprised at least 50% of grains larger than 60 μm and smaller than 300 μm, and the remainder of said wall consisting essentially of grains less than or equal to 60 μm that provide high resistivity to corrosive attack.

4. A discharge vessel body according to claim 3, wherein said inner surface region of one grain thickness is comprised at least 80% of grains having a size from 80 μm to 120 μm.

* * * * *